United States Patent [19]

Mohrbacker et al.

[11] 4,084,833
[45] Apr. 18, 1978

[54] CASTERED LOAD TRANSFER AXLE STABILIZER

[75] Inventors: William J. Mohrbacker, Milwaukee; Earl C. Thayer, Cedarburg, both of Wis.

[73] Assignee: Rexnord Inc., Milwaukee, Wis.

[21] Appl. No.: 742,823

[22] Filed: Nov. 18, 1976

[51] Int. Cl.² .............................................. B62D 61/12
[52] U.S. Cl. ...................... 280/81 A; 180/24.02; 280/43.23; 280/446 B; 303/22 R
[58] Field of Search .................. 280/81 A, 43.23, 767, 280/81 R, 446 B; 180/24.02; 303/22 R

[56] References Cited

U.S. PATENT DOCUMENTS

| 3,191,961 | 6/1965 | Brennan et al. | 180/24.02 X |
| 3,204,977 | 9/1965 | Eisenhauer et al. | 280/445 |
| 3,403,925 | 10/1968 | Sauer | 280/81 A |
| 3,567,189 | 3/1971 | Buelow | 259/176 |
| 3,704,896 | 12/1972 | Buelow | 280/81 A |
| 3,877,715 | 4/1975 | Thayer et al. | 280/81 A |
| 3,880,439 | 4/1975 | Wolter | 280/81 A |
| 3,985,369 | 10/1976 | O'Leary | 280/432 |

Primary Examiner—Kenneth H. Betts

[57] ABSTRACT

The load supported and transferred by the rear auxiliary axle of a truck is commonly determined by the fluid pressure supportively disposed between the auxiliary axle and the rear end of the truck frame. Where the auxiliary axle is some distance to the rear of the truck for that purpose, the wheels are castered to avoid scuffing. The castering, however, must generally be damped to avoid fluttering of the wheels and shimmying of the axle. Frictional damping means which is here disclosed is both adjustable and varied automatically with the amount of such pressure and the amount of load transferred. In particular the stability of the vehicle is greatly improved.

7 Claims, 8 Drawing Figures

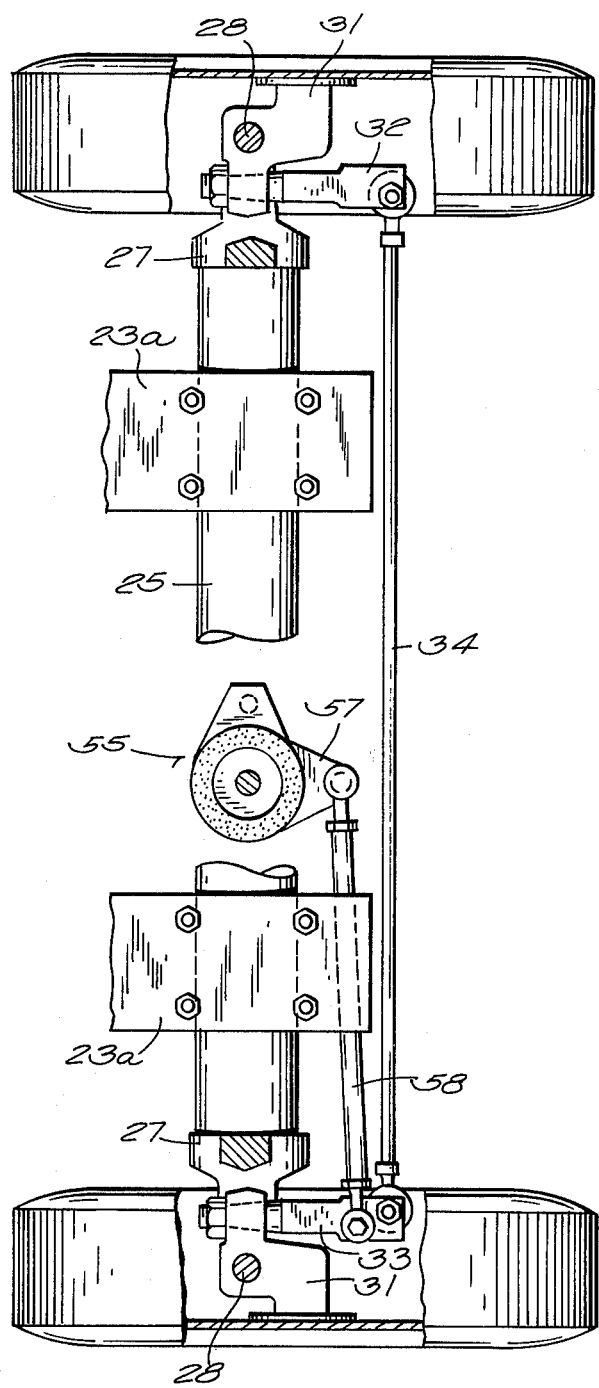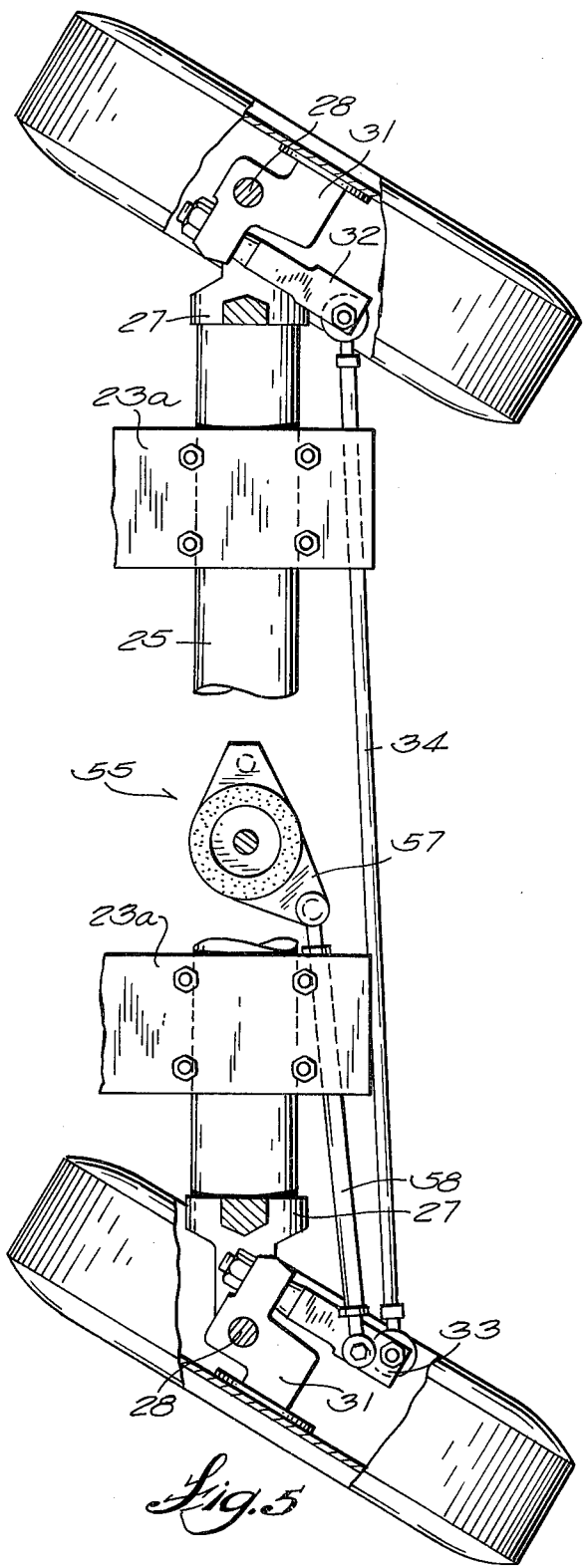
Fig. 4
Fig. 5

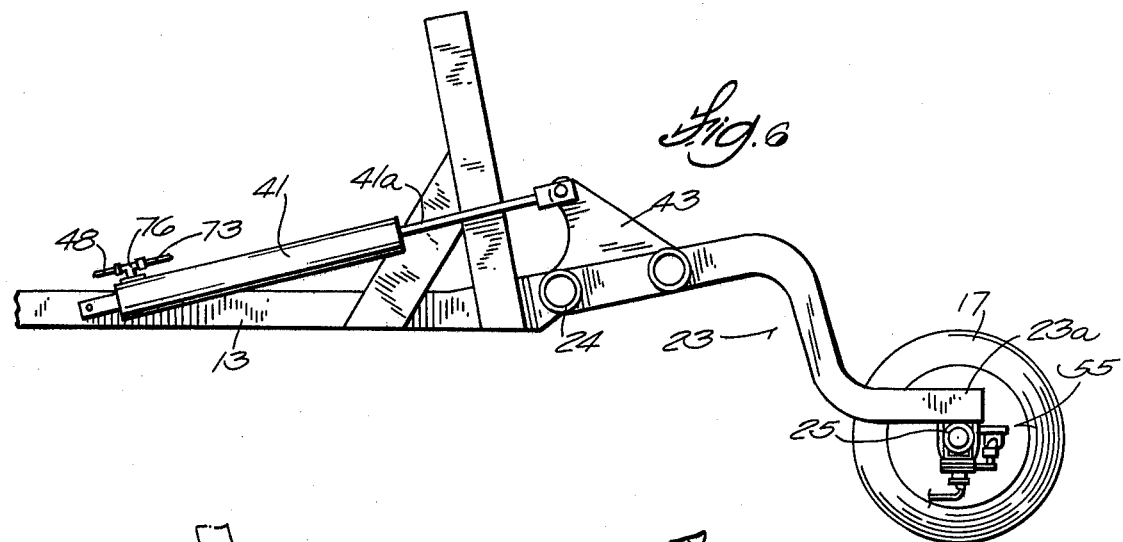
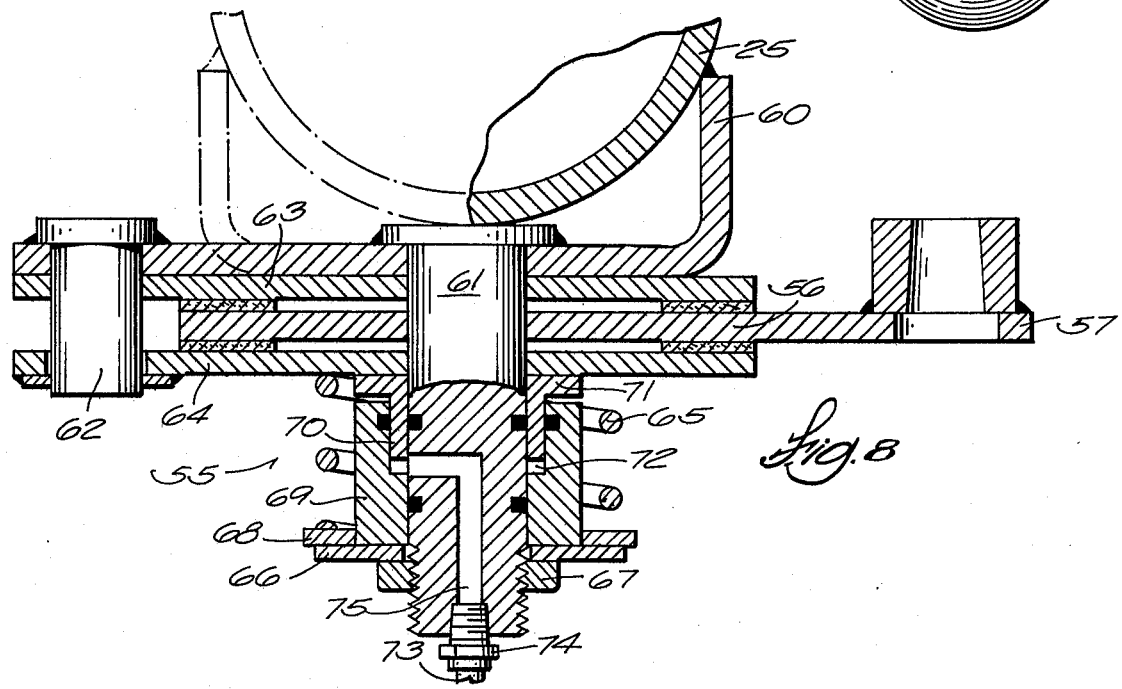
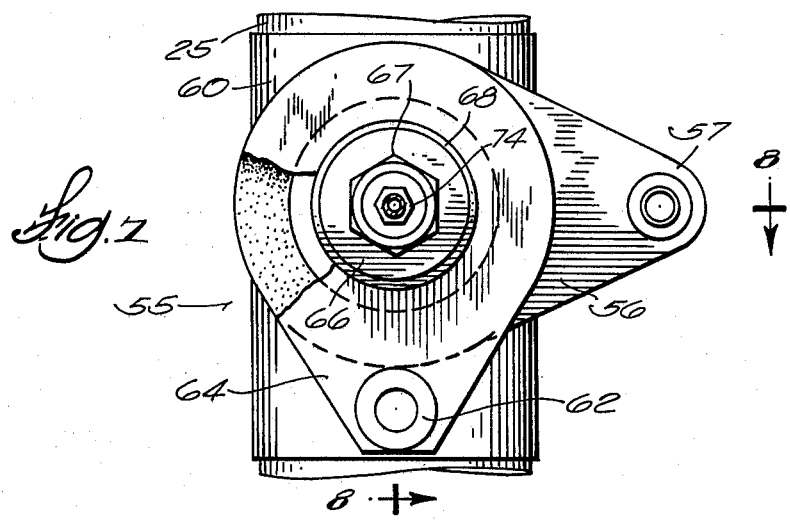

CASTERED LOAD TRANSFER AXLE STABILIZER

BACKGROUND OF THE INVENTION

U.S. Pat. Nos. 3,567,189 and 3,704,896 show auxiliary axles for trucks having castered wheels. With reference to the latter patent, hydraulic damping of the castered wheels is commonly provided.

In a hydraulic damping system however, the degree of damping varies with the velocity of the motion being damped and thus such systems serve to prevent some wheel fluttering but no more. Additionally, such systems are not at all adapted to being adjustable.

It has been discovered that a frictional damping device which is readily adjustable also dependably provides a remarkable degree of directional stability in the operation of the vehicle, provided that such adjustment is properly correlated with the amount of the load of the particular vehicle and its operating characteristics.

It is an object of the invention to provide a suitable automatic adjustment of such damping; to provide the same in a compact, sturdy inexpensive, accessible assembly; to provide the same with an added damping having a fixed rate which is adjustable and which upon adjustment thereafter remains fixed.

U.S. Pat. No. 3,877,715 of another and Earl C. Thayer who is the joint inventor here shows a typical hydraulic system for operating a rear auxiliary axle with castered wheels. The present invention is particularly adapted to utilizing the hydraulic pressure available in such a system.

SUMMARY OF THE INVENTION

A frictional damping device is linked to the castered wheels of the auxiliary load transfer axle of a truck and is adjustable according to the truck load whereby the device stabilizes the directional control of the truck and also prevents fluttering of the castered wheels. Preferably the amount of damping provided additively includes a preset component which is also the minimum and a component which can be varied according to the amount of load on the auxiliary axle.

More particularly, a rear, load-transfer axle for a truck includes castered wheels; fluid pressure effects and determines the amount of the load transferred. A disc brake is both spring biased and fluid pressure operated and is connected to the wheels to damp their castering movements. The spring may be set for a given minimum level of wheel stabilizing or damping and the fluid pressure which determines the amount of load transferred also operates the disc brake whereby the brake provides an additional amount of damping which amount varies automatically with the load transferred.

BRIEF DESCRIPTION OF THE DRAWINGS

FIG. 4 is a plan view of the load-transfer axle with parts of the wheels broken away and sectioned to show their castered steering knuckles.

FIG. 5 is a view similar to FIG. 4 with the wheels turned such as while the truck is making a left turn.

FIG. 6 shows parts of the truck frame, the rear load-transfer axle assembly and the damping brake carried by the latter.

FIG. 7 is a view of the disc brake shown in FIG. 6, looking upwardly.

FIG. 8 is an enlarged section taken on the offset lines 8—8 of FIG. 7.

DETAILED DESCRIPTION OF THE PREFERRED EMBODIMENT

Figure 1:
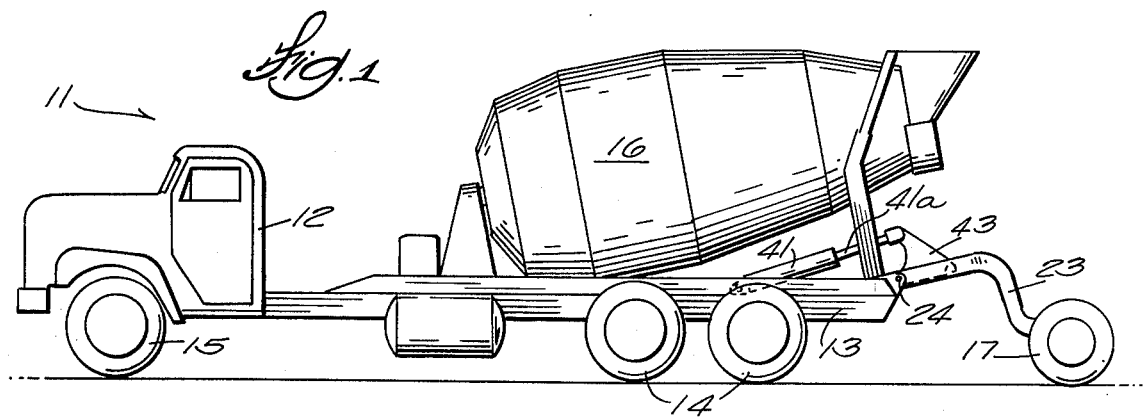
FIG. 1 shows a truck mixer in side elevation. The rear load-transfer wheels are in operation.

The truck mixer 11 as shown includes the truck 12 having an extended frame 13, the rear tandem driven wheels 14 and the forward steerable wheels 15. The inclined concrete mixing drum 16 is rotated through a drive means by the truck engine. The center of gravity of drum 16 when loaded is only slightly forward of the tandem wheels 14 such that the steerable wheels 15 are relatively unloaded. The rearmost wheels 17, as will be described, are pressurized in a conventional manner to relieve wheels 14 of some of the truck weight and to transfer some of the truck weight from wheels 14 to the forward wheels 15.

For that purpose, the forward end of truck frame extension 23 is connected to the rear end of truck frame 13 by the pivot 24 (FIGS. 1, 2 and 6) and the rear trailing arms 23a of extension 23 extend over and are bolted to the tubular axle 25 between wheels 17 (FIGS. 4–6).

Each end of axle 25 is provided with a yoke 27 having a kingpin 28. The steering knuckles 31 are mounted on the two kingpins 28; in FIGS. 4 and 5 the upper shown knuckle 31 is the right knuckle and is provided with control arm 32; the lower shown knuckle 31 is provided with the left control arm 33. The tie rod 34 connects the two control arms so that the wheels are in parallel relation during forward travel and nearly so in forward travel to the left or right. The spindle, not shown, of each knuckle and on which each wheel is rotatably mounted is located rearward of the kingpin on which the knuckle is turnable. Each wheel is thus castered in the forward direction of truck travel.

The hydraulic cylinder 41 beneath drum 16 provides for pressurizing the wheels 17 and also for raising the wheels when not required and as may be required for rearward truck movement. For that purpose, the closed end of cylinder 41 is connected to the frame 13 of truck 12 and the piston rod 41a of cylinder 41 is connected to the lever arm 43 of frame extension 23.

Figure 3:
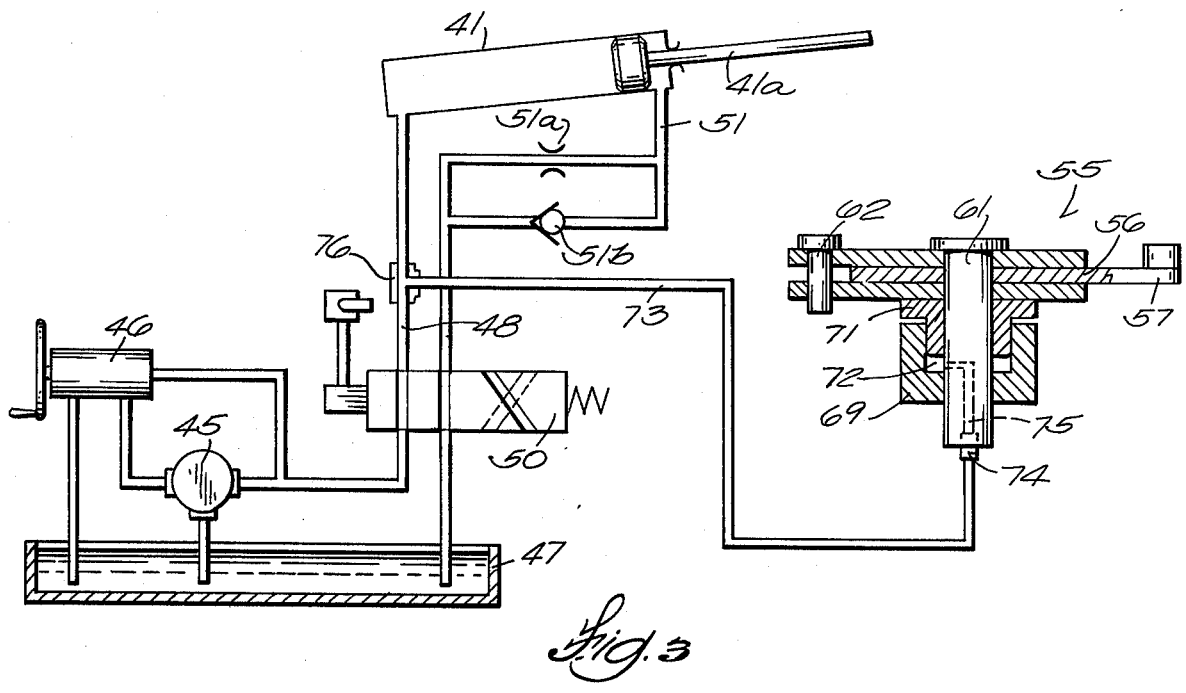
FIG. 3 is an abbreviated diagram of the hydraulic circuit of the truck for operating the load-transfer axle as shown.

With reference to FIG. 3, the pump 45 is driven by the engine of truck 12 and its output pressure is selectively controlled by the manually adjustable control 46. The output of pump 45 from sump 47 is directed through line 48 to the closed end of cylinder 41 by valve 50 in the position shown and the rod end of cylinder 41 is connected by line 51 to sump 47. In this position of valve 50, the selected pressure from pump 45 applies a given downward force to wheels 17 which effects the desired weight transfer effect. An accumulator, not shown, is connected to line 48 so that fluid displacement due to variations in the elevation of wheel tracking effects only momentary, minimal variations in backpressure. The parallel restriction 51a and one-way valve 51b in line 51 and other means, not shown, maintain some pressure in line 51 at all times.

Figure 2:
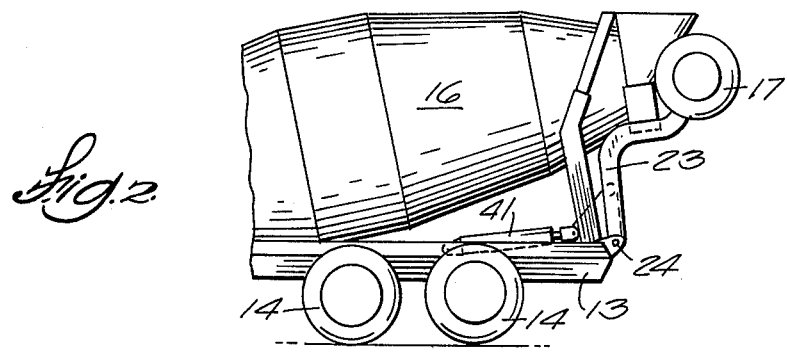
FIG. 2 shows the rear portion of the truck with the load-tranfer wheels elevated.

In the other position of valve 50, not shown, the valve pressure from pump 45 is directed to line 51 to raise wheels 17 to the position of FIG. 2. In relowering the wheels, the fluid must pass through restriction 51a which prevents the wheels from dropping rapidly.

The small amount of caster of wheels 17, as shown, is desirable to minimize the sideward offset of wheels 17 when truck 12 turns a corner, but requires also some damping or stabilizing. A double acting hydraulic snubber, not shown, has been mounted on axle 25 and connected to the rod 34. However, such a snubber is not generally adjustable, except by replacement, and is not at all responsive to the different tendencies of the wheels (17) to fluttering under different load conditions. A large factor here is the fact that the wheels 17 comprise pneumatic tires having a relatively small tire print or area applied to the road at low pressures and a large print or area under maximum loads.

The stabilizer of the present invention comprises the disc brake 55 having a turnable clamped disc 56 provided with an extended arm 57 connected by rod 58 to the left control arm 33. As shown in detail in FIG. 8, the upward flanges of U-frame 60 are welded to axle 25 and frame 60 includes the downward extending central pin 61 and the holding pin 62. The upper and lower brake plates 63 and 64, respectively, are mounted on pin 61 and are held against rotation by pin 62. The disc 56 is clamped between plates 63 and 64 at all times by the coil spring 65 disposed between plate 64 and the washer 66 mounted on the threaded lower end of pin 61. As shown, wear-resistant discs are suitably provided between the disc 56 and the upper and lower plates 63 and 64. Washer 66 is supported by the nut 67 threaded on the lower end of pin 61 such that it may be removed and one or more shims may be readily interposed between the lower end of spring 65 and washer 66. One such shim 68 is shown.

Washer 66 also supports the collar 69 on pin 61 within spring 65. The upper end of collar 69 is counter bored as at 70 to receive the lower end of the sleeve 71 which is slidable on pin 61 and in the counterbore 70. The enlarged upper end of sleeve 70 is in direct contact with the underside of plate 64 and the counterbored portion of collar 69 below the sleeve forms an expansible chamber 72. Fluid pressure from line 48 is applied to chamber 72 by line 73 which is connected to fitting 74 threaded in the lower end of pin 61.

For that purpose, the passageway 75 provided in the lower portion of pin 6 as shown in broken lines extends from fitting 74 to chamber 72. Also, the tee 76 connects line 48 and line 73 with cylinder 41 so that the fluid pressure in cylinder 41 and in chamber 72 is the same at all times and under all conditions. For convenience, control 46 is calibrated according to the amount of concrete in drum 16 as will be described below. At each setting, the appropriate pressure provides the optimum distribution of the weight of the truck mixer on its wheels 14, 15 and 17.

That is, in the operation of truck mixer 11 with wheels 17 down and pressurized, a corresponding clamping force is applied to disc 56 in addition to that applied by spring 65. The amount of this additional clamping force is manually preset by the pressure control 46. Thus, when the truck is fully loaded and the wheels 17 are fully "pressurized," maximum damping of wheels 17 is provided. Assuming that a partial load of concrete has been delivered at one jobsite and truck mixer 11 is en route to another location, the pressure control 46 is then reset and the clamping force applied to disc 56 is reduced. It is noted, of course, that the total reduction is to a degree proportionately less at lower loads. This has been found desireable or necessary because of the effect of the pneumatic tires of wheels 17 and other factors.

The tabulation below shows in column (2) the amount of pressure in line 48 as set according to the number of yards of concrete in drum 16 (column (1)). The pressures shown are typical only. Column (2) also shows the amount of clamping force provided by the fluid pressure in chamber 72 having an effective area of one square inch. Column (3) shows the selected constant force provided typically by spring 65 and column (4) shows that total clamping force at the selected setting.

| (1) Cubic Yards in Drum | (2) Hydraulic Pressure and Force* | (3) Total Clamping Force** | (4) Weight on Auxiliary Wheels*** |
|---|---|---|---|
| 10 | 1900 | 2200 | 10500 |
| 9 | 1700 | 2000 | 8500 |
| 8 | 1200 | 1500 | 6500 |
| 7 | 1000 | 1300 | 5000 |
| 6 | 1000 | 1300 | 5000 |
| 5 | 1000 | 1300 | 5000 |
| 4–0 | (wheels 17 raised) | | |

*psi., piston area is 1 square inch
**Includes force of spring: 300 lbs.
***Does not include deadweight of wheels 17 etc., 1500 lbs. approximate From the above, it will be noted that somewhat more damping, proportionally, is provided when wheels 17 are less pressurized. This is important to provide a balanced amount of wheel stabilization under all operating conditions and is dependably provided. Adjustments may, of course, be required where the truck mixer operates more generally over unimproved or gravel roads. Also, a change in the type of the tires of wheels 17 may require the removal of shim 68 or the addition of others to change the clamping force provided by spring 65. As shown, the auxiliary wheels 17 are not used when the drum content is less than 5 cubic yards of concrete.

Spring 65 also serves to provide some stabilization of the wheels 17 when there is no pressure in chamber 72. The spring also holds the disc 56 between plates 63 and 64 at all times so that no dust or grit can enter between them and the friction discs and accelerate their wear.

In the typical truck mixer described, the truck wheelbase is in the order of 232 inches and wheels 17 are in the order of 160 inches to the rear of tandem wheels 14. Ten cubic yards of concrete in drum 16 weigh about 40,000 pounds. This is an especially heavy and highly placed load for a present-day, over-the-road truck of an 8-foot maximum width and having pneumatic tires. Considering that the tires of wheels 14 support only about three-fourths of that load, there is a tendency for such a truck to weave or wander or oversteer at moderate to highway speeds.

Wheel fluttering is generally initiated when one or the other wheel 17 runs over an object in its path and its change in castering in effect is telegraphed to the other wheel and then "echoes" back and forth. Weaving or wander of the truck may be initiated by such fluttering; more commonly, it is initiated by moderately sudden changes in the sideward pitch of the road and or the tendency to oversteering by the operator.

The stabilizer of the present invention tends to keep wheels 17 in whatever steering positions they have so that with their location considerably to the rear of the truck they firmly hold the truck in its direction of travel. However, the amount of damping which will not interfere with normal steering of the truck by turning wheels 15 is critical and depends on the load of the truck and its characteristics. The present invention provides for varying such damping so that optimum directional stability of the truck can be dependably provided.

Control 46 is, of course, suitably calibrated for the amount of the load in drum 16; the rate of damping by brake 55 is thus also calibrated. A separate calibrated control for brake 55 would be less preferred and would introduce the possibility that brake 55 might be properly set but the amount of load transfer would be incorrect, or vice versa.

It is important to note that the selected amount of the load carried by wheels 17 remains relatively constant as long as the same actual load is being carried and that this is essential to allowing the friction damping of the castering of wheels 17 to be preset at a rate which stabilizes the directional control of truck 12 without interfering with such control by wheels 15.

We claim:

1. An auxiliary load-transfer device for connection to the rear of a truck frame comprising an axle, a castered wheel at each end of said axle and having a steering knuckle, arms pivotally connecting the axle to the truck frame, a first expansible fluid pressure operated means interposed between the truck frame and said axle and operable to provide the selected support of the rear of the truck by said wheels, a supply of fluid under pressure connected to said means and having a manually operable pressure control, a friction brake which is carried by said axle and is connected to said steering knuckles and includes a second expansible fluid pressure operated means, and fluid pressure lines connecting said first and second expansible fluid pressure operated means whereby the amount of load transferred as determined by the manual adjustment of said fluid pressure control determines also the amount of caster damping of the wheels to improve the directional stability of the truck.

2. In a truck-vehicle having forward steering wheels and a rearward extension having auxiliary load supporting rear wheels and means by which said rear wheels are castered so that they follow the directional movements of the truck, a variable rate friction brake connected to said castering means, pressure operated means connected to said brake to operate the same, and sensing means which is responsive to the load supported by said rear wheels and controls said pressure operated means to vary the braking rate of said friction brake to correspond with the load supported by said rear wheels whereby the directional control of the truck by the steering wheels is stabilized without interfering with such directional control.

3. The truck-vehicle of claim 2 wherein the rear extension includes adjustable pressure operated means by which the load supported by the rear wheels may be preset and is held relatively constant so that the rate of braking which is selected remains the optimum while the load carried by the truck-vehicle remains unchanged.

4. The truck-vehicle of claim 3 wherein the adjustable pressure operated means and the variable friction brake are calibrated and are adjustable together whereby the optimum braking rate is automatically provided according to the adjustment of the pressure operated means.

5. In combination with castered load-transfer wheels at the rear of a truck and having a first expansible fluid pressure operated means interposed between the truck frame and said wheels and operable to provide the selected support of the rear of the truck, a supply of fluid under pressure connected to said means and having a manually operable pressure control, a friction brake which is connected to said wheels so as to damp the castering of said wheels and includes a second expansible fluid pressure operated means, and fluid pressure lines connecting said first and second expansible fluid pressure operated means whereby the amount of load transferred as determined by the manual adjustment of said fluid pressure control determines also the amount of caster damping of the wheels to prevent their fluttering under variable conditions.

6. The combination of claim 5 wherein the friction brake is of the disc type and is located between the castered load-transfer wheels.

7. The combination of claim 5 wherein said fluid supply includes a control which varies the fluid supply output in response to the output pressure and operates to hold the pressure of the supplied fluid relatively constant so that the amount of load carried by the castered wheels is relatively constant and the directional control of the truck is dependably stabilized without interfering with normal steering of the truck.

* * * * *